(12) United States Patent
Shibuya

(10) Patent No.: US 6,826,702 B1
(45) Date of Patent: Nov. 30, 2004

(54) METHOD AND APPARATUS FOR REDUCING POWER CONSUMPTION OF A CPU IN A RADIO SET BY ADAPTIVELY ADJUSTING CPU CLOCK FREQUENCY ACCORDING TO CPU LOAD

(75) Inventor: Toshiyuki Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 09/671,690

(22) Filed: Sep. 28, 2000

(30) Foreign Application Priority Data

Sep. 28, 1999 (JP) .......................................... 11-275121

(51) Int. Cl.⁷ ................................................ G06F 1/32
(52) U.S. Cl. ..................................... 713/320; 713/322
(58) Field of Search ................................ 713/300, 320, 713/322, 340

(56) References Cited

U.S. PATENT DOCUMENTS

| | | | | |
|---|---|---|---|---|
| 5,710,929 A | * | 1/1998 | Fung | 713/322 |
| 5,724,591 A | * | 3/1998 | Hara et al. | 713/322 |
| 5,774,704 A | * | 6/1998 | Williams | 713/501 |
| 6,076,171 A | * | 6/2000 | Kawata | 713/501 |
| 6,425,086 B1 | * | 7/2002 | Clark et al. | 713/322 |

FOREIGN PATENT DOCUMENTS

| | | | | |
|---|---|---|---|---|
| JP | 4-235618 A | 9/1985 | | |
| JP | 60-182818 A | 9/1985 | | |
| JP | 1-292416 A | 11/1989 | | |
| JP | 3-51902 A | 3/1991 | | |
| JP | 4-311230 A | 11/1992 | | |
| JP | 5-28116 A | 2/1993 | | |
| JP | 8-6681 A | 1/1996 | | |
| JP | 10-161780 | 6/1998 | | |
| JP | 11-88254 | 3/1999 | | |
| JP | 11-161383 A | 6/1999 | | |
| JP | 2000112756 A | * | 4/2000 | G06F/9/30 |

OTHER PUBLICATIONS

"Method for Measuring a CPU Load", IBM Technical Disclosure Bulletin, Oct. 1, 1972, US, p. 1650.*

* cited by examiner

Primary Examiner—Rehana Perveen
Assistant Examiner—Paul Yanchus, III
(74) Attorney, Agent, or Firm—Sughrue Mion, PLLC

(57) ABSTRACT

A power consumption reducing method for a radio set is disclosed. A CPU 12 controls various parts of the radio set. A clock signal is fed out to the CPU 1, and its frequency is controlled according to a read signal SRU instructing the reading of data from the CPU 1.

21 Claims, 4 Drawing Sheets

METHOD AND APPARATUS FOR REDUCING POWER CONSUMPTION OF A CPU IN A RADIO SET BY ADAPTIVELY ADJUSTING CPU CLOCK FREQUENCY ACCORDING TO CPU LOAD

BACKGROUND OF THE INVENTION

The present invention relates to power consumption reducing methods for various radio telephone sets such as portable/car telephone sets (or cellular sets) and personal handyphone systems having cordless telephone function and cellular function and various radio sets such as pocket bells, personal radio sets and civil radio sets (CB) and also to radio sets and, more particularly, to power consumption reducing systems or radio sets, in which it is possible to reduce power consumption of a central processing unit (CPU) for controlling various components therein and also to radio sets adopting the same methods.

Japanese Patent Laid-Open No. 10-161780 discloses a power consumption reducing method in a conventional portable terminal. The disclosed portable terminal comprises a CPU, a clock oscillator, a key input detector and an interruption controller with a time division multiplex system. When the portable terminal is set in an intermittent receiving mode, the CPU feeds out a suspension signal to the clock oscillator to suspend the oscillation of the clock oscillator and set up a suspension mode. Subsequently, when the key input detector detects the operation of the keyboard, it feeds out a signal to an interruption controller. At this time, the interruption controller starts the clock oscillator. When the oscillation is stabilized, the clock oscillator supplies a clock signal to the CPU. After the oscillation of the clock oscillator has been stabilized, the interruption controller switches the mode of the CPU. With this construction, it is possible to reduce the operation currents in the CPU and the clock oscillator.

Japanese Patent Laid-Open No. 11-88254 discloses a power consumption reducing method for a conventional radio set. A CPU in this example of radio set controls an operation for the CPU by controlling an operation clock feed-out element with software according to its processing load. With this construction, it is possible to optimize the power consumption of the CPU.

However, the power consumption reducing method for the conventional portable terminal disclosed in the Japanese Patent Laid-Open No. 10-161780 adopts the time division reducing method for communication, and is applicable to only radio sets, which can be set in the intermittent receiving mode. In other words, the disclosed method has a drawback that it can not be applied to radio sets adopting systems other than the time division multiplex system for communication or to radio units, which transmit and receive data continuously without being set in any intermittent receiving mode and also adopts the time division multiplex system is adopted for communication. That is, the method is poor in versatility.

In the power consumption reducing method for the conventional radio unit disclosed in the Japanese Patent Laid-Open No. 11-88254, the CPU itself has to measure its own processing load and control the operation clock feed-out element. Therefore, software for the power consumptiom reducing process is required separately in addition to that for the normal processing. Besides, the CPU should bear extra burden for the power consumption reducing process, and the power consumption is rather increased. It is thus impossible to efficiently reduce the power consumption.

SUMMARY OF THE INVENTION

The present invention was made in the light of the above background, and it has an object of providing a power consumption reducing method for a radio set, which features rich versatility, require no special software, is free from any extra burden on the CPU and permits efficiently reducing the power consumption.

According to an aspect of the present invention, there is provided a power consumption reducing method for a radio set, wherein: a frequency of a clock signal fed out to a central processing unit for controlling various parts of the radio set is controlled on the basis of proportional-to-load signal, which is fed out from the central processing unit and substantially in a proportional relation to the variation of the load on the central processing unit.

According to another aspect of the present invention, there is provided a power consumption reducing method for a radio set, wherein: a frequency of a clock signal fed out to a central processing unit for controlling various parts of the radio set is controlled on the basis of the number of pulses of the proportional-to-load signal fed out from the central processing unit in a predetermined period of time.

According to other aspect of the present invention, there is provided a power consumption reducing method for a radio set, wherein: a frequency of a clock signal fed out to a central processing unit for controlling various parts of the radio set is controlled on the basis of the number of pulses of the proportional-to-load signal fed out from the central processing unit in a predetermined period of time so that the frequency of the clock signal is increased when the number of pulses of the proportional-to-load signal is greater than a predetermined threshold value, is reduced when the number of pulses is less than the threshold value, and is held without being changed when the number of pulses is the same as the threshold value.

According to still other aspect of the present invention, there is provided a power consumption reducing method for a radio set, wherein: a frequency of a clock signal fed out to a central processing unit for controlling various parts of the radio set is controlled on the basis of the number of pulses of the proportional-to-load signal fed out from the central processing unit in a predetermined period of time so that the frequency of the clock signal is increased when the number of pulses of the proportional-to-load signal is greater than a predetermined threshold value, is reduced when the number of pulses is less than the threshold value, and is held without being changed when the number of pulses is the same as the threshold value, and the threshold value is increased by a predetermined value when the number of pulses is greater than the threshold value, is reduced by a predetermined value when the number of pulses is less than the thresholds value, and is held without being changed when the number of pulses is the same as the threshold value.

The proportional-to-load signal is a read signal instructing the reading of data or a write signal instructing the writing of data.

According to further aspect of the present invention, there is provided a radio unit comprising: a central processing unit for controlling various parts of the radio set to realize a radio communication function; an oscillator for generating a clock signal at frequency controlled on the basis of a control signal and feeding out the clock signal to the central processing unit; and a frequency control circuit for generating the control signal on the basis of a proportional-to-load signal, which is fed out from the central processing unit and substantially in a proportional relation to the variation of the load on the central processing unit.

According to still further aspect of the present invention, there is provided a radio unit comprising: a central processing unit for controlling various parts of the radio set to realize a radio communication function; an oscillator for generating a clock signal at frequency controlled on the basis of a control signal and feeding out the clock signal to the central processing unit; and a frequency control circuit for generating the control signal on the basis of the number of pulses of a proportional-to-load signal which is fed out from the central processing unit in a predetermined period of time and substantially in a proportional relation to the variation of the load on the central processing-unit.

The frequency control circuit includes a timing signal generator, a counter, a threshold register, a comparator and a control signal generator; the timing signal generator generates a first timing signal becoming active for every predetermined cycle period according to the clock signal, and a second to a fourth timing signal becoming active upon lapse of respective different times from an instant when the first timing signal has become active in every cycle time of the first timing signal; the counter counts pulses of the proportional-to-load signal for a period from an instant when the first timing signal becomes active till an instant when the first timing signal becomes active again; the threshold register stores initial threshold data set as present threshold data when the power supply to the radio set is turned on and step data set in the central processing unit upon lapse of a predetermined period of time from an instant when the power supply to the radio unit is turned on, and computes and stores present threshold data according to the present threshold data, the step data and comparison data fed out from the comparator when the fourth timing signal becomes active; when the second timing signal becomes active, the comparator compares the count data fed out from the counter and the present threshold data fed out from the threshold register, and feeds out the result of comparison as comparison data to the threshold register and the control signal generator; and when the third timing signal becomes active, the control signal generator converts the comparison data to the control signal and feeds out the control signal to the oscillator when the third timing signal becomes active.

The control signal generator generates a control signal for-increasing the frequency of the clock signal when the comparison data indicates that the count data is greater than the present threshold data, generates a control signal for reducing the frequency of the clock signal when the comparison data indicates that the count data is less than the present threshold data, and generates a control signal for holding the present frequency of the clock signal without being changed when the count data indicates that the count data is the same as the present threshold data.

The threshold register makes the result of addition of the step data to the prevailing present threshold data to be new present threshold data when the count data indicates that the count data is greater than the prevailing present threshold data, makes the result of the subtraction of the step data from the prevailing present threshold data to be new present threshold data when the comparison data indicates that the count data is less than the prevailing present threshold data, and directly makes the prevailing present threshold data to be new present threshold data when the comparison data indicates that the-count data is the same as the prevailing present threshold data.

The proportional-to-load signal is a read signal instructing the reading of data or a write signal instructing the writing of data.

The oscillator is a voltage controlled oscillator for generating a clock signal at frequency corresponding to the voltage of the control signal.

Other objects and features will be clarified from the following description with reference to attached drawings.

PREFERRED EMBODIMENTS OF THE INVENTION

Preferred embodiments of the present invention will now be described with reference to the drawings.

Figure 1:
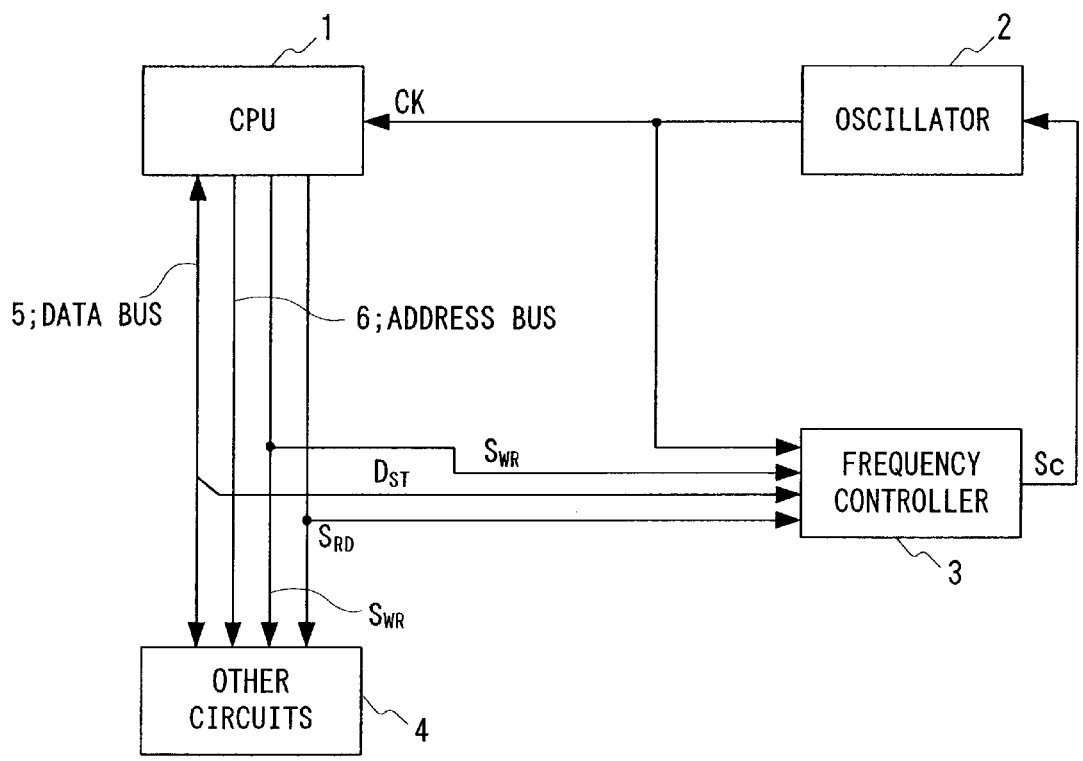
FIG. 1 is a block diagram showing the electric construction of a embodiment of radio set according to the present invention.

FIG. 1 is a block diagram showing the electric construction of an embodiment of radio set according to the present invention.

This embodiment of the radio set comprises a CPU 1, an oscillator 2, a frequency control circuit 3, other circuits 4, a data bus 5 and an address bus 6.

The CPU 1 reads out programs stored in a memory unit constituted by the other circuits 4 via the data bus 5 and address bus 6, and reads out the read-out programs. When reading out data stored in the memory unit, etc., the CPU 1 feeds out an address corresponding to the stored data via the address bus 6, and also feeds out a read signal SRD instructing the reading of the data to the other circuits 4. When writing data in the memory unit, etc., the CPU 1 feeds out the data and an address corresponding thereto via the data and address buses 5 and 6, respectively, to the other circuits 4, and also feeds out a write signal SWR instructing the writing of the data to the other circuits 4.

The oscillator 2 may be a voltage controller oscillator VCO), etc., for generating a clock signal CK at a frequency corresponding to the input voltage. The oscillator 2 generates a clock signal CK, which is at a frequency controlled according to a control signal $S_C$ supplied from the frequency control circuit 3, and feeds out the clock signal $S_C$ to the CPU 1 and the frequency control circuit 3. The frequency control circuit 3 generates the control signal $S_C$ for controlling the frequency of the clock signal CK according to the read signal SRD supplied from the CPU 1 and step data DST supplied from the CPU 1 via the data 5, and feeds out the generated clock signal to the oscillator 2. The other circuits 4 comprise a transmitting/receiving unit, a modulating/demodulating unit, a memory unit, a display unit, an operating unit, etc. The other circuits 4 are connected via the data and address buses 5 and 6 to the CPU 1, and realizes a radio communication function under control of the CPU 1.

Figure 2:
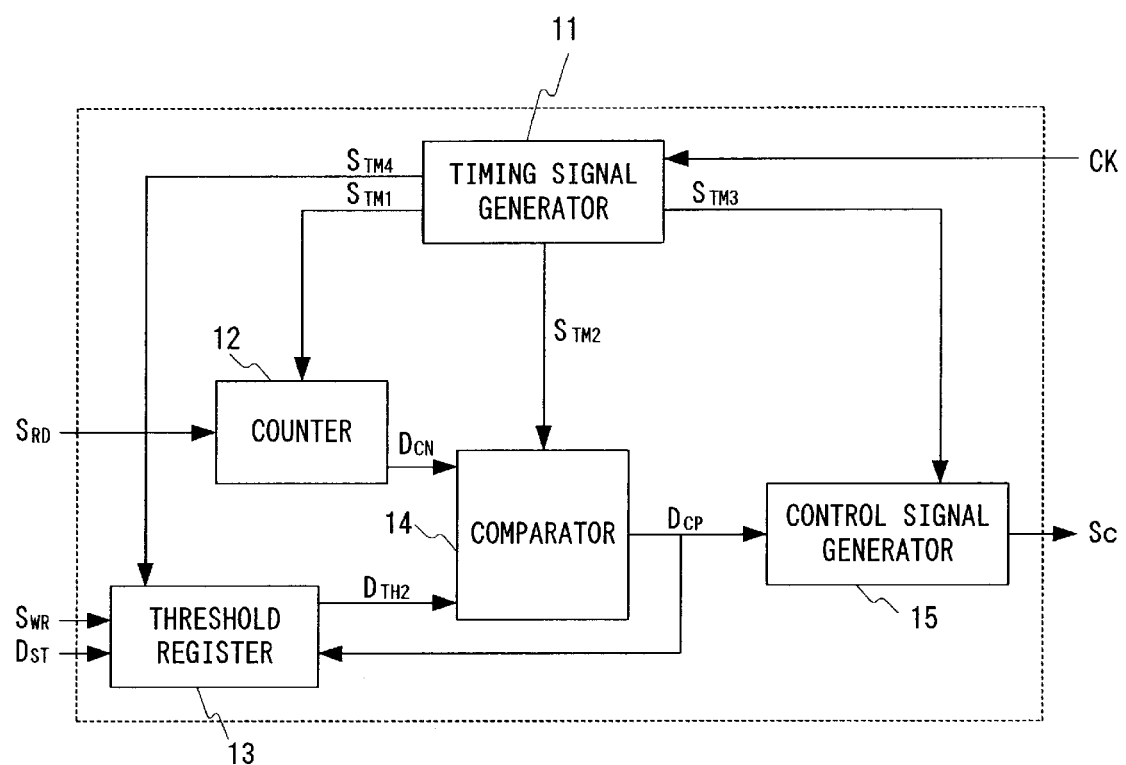
FIG. 2 is a block diagram showing the construction of the frequency control circuit 3.

The construction of the frequency control circuit 3 in this embodiment will now be described with reference to FIG. 2.

The frequency control circuit 3 includes a timing signal generator 11, a counter 12, a threshold register 13, a comparator 14, and a control signal generator 15.

Figure 4:
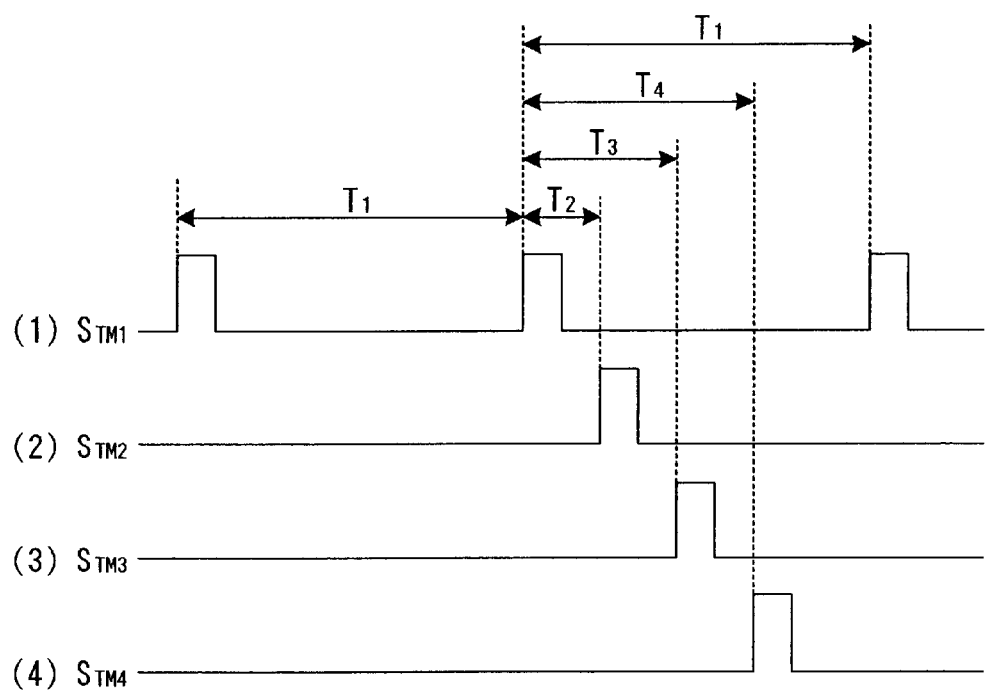
FIG. 4 is a timing chart for describing the operation of the power consumption reducing operation in the radio set according to the present invention.

The timing signal generator 11 generates four different timing signals $S_{TM1}$ to $S_{TM4}$ as shown in FIG. 4 under control of the clock signal CK fed out from the oscillator 2, and feeds out these timing signals $S_{TM1}$ to $S_{TM4}$ to the counter 12, the comparator 14, the control signal generator 15 and the threshold register 13, respectively. As shown at (1) in FIG. 4, the timing signal $S_{TM1}$ is a signal which becomes active for every predetermined time $T_1$. As shown at (2) in FIG. 4, the timing signal $S_{TM2}$ is a signal which becomes active at a time $T_2$ after the timing signal $S_{TM1}$ has become active in every cycle period thereof. As shown at (3) in FIG. 4, the timing signal $S_{TM3}$ becomes active at a time $T_3$ after the timing signal $S_{TM1}$ has become active in every cycle period thereof. As shown at (4) in FIG. 4, the timing signal $S_{TM4}$ becomes active at a time $T_4$ after the timing signal $ST_1$ has become active in every cycle period thereof.

The counter 12 counts pulses of the read signal $S_{RD}$ fed out from the CPU 1 for a period from an instant when the timing signal $S_{TM1}$ fed out from the timing signal generator 11 becomes active till an instant when the signal $S_{TM1}$ becomes active again, and feeds out the counter value as count data $D_{CN}$ to the comparator 14.

In the threshold register 13, initial threshold data $D_{TH1}$, step data $D_{ST}$ and present threshold data $D_{TH2}$ are stored. When the power supply of the radio set is turned on, the initial threshold data $D_{TH1}$ is stored as present threshold data $D_{TH2}$ in the threshold register 13. A predetermined period of time after the power supply to the radio unit has been turned on, step data $D_{ST}$ is fed out from the CPU 1 via the data bus 5, and is stored in the threshold register 13. When the timing signal $S_{TM4}$ becomes active, the present threshold data $D_{TH2}$ is computed according to threshold data $D'_{TH2}$ the step data $D_{ST}$ and comparison data $D_{CP}$ fed out from the comparator 14, and is stored in the threshold register 13 and fed out to the comparator 14. The method of computing the present threshold data $D_{TH2}$ in the threshold register 13 will now be described.

When the timing signal $S_{TM2}$ becomes active, the comparator 14 compares the count data $D_{CN}$ fed out from the counter 12 and the present threshold data $D_{TH2}$ fed out from the threshold register 13, and feeds out the result of comparison as comparison data $D_{CP}$ to the threshold register 13 and the control signal generator 15. As an example, the comparison data $D_{CP}$ is expressed as "10" when the count data $D_{CN}$ is greater than the present threshold data $D_{TH2}$, as "01" when the count data $D_{CN}$ is less than the present threshold data $D_{TH2}$, and as "00" when the count data $D_{CN}$ is the same as the present threshold data $D_{TH2}$.

When the timing signal $S_{TM3}$ becomes active, the control signal generator 15 converts the comparison data $D_{CP}$ supplied from the comparator 14 to the control signal $S_C$, and continuously feeds out the signal $S_C$ to the oscillator 2. When the oscillator 2 is constituted by the VCO, when the comparison data $D_{CP}$ is "00", i.e., when the count data $D_{CN}$ is equal to the present threshold data $D_{TH2}$, the control signal generator 15 feeds out the control signal $S_C$ as preset reference voltage $V_{REF}$ to hold the frequency of the clock signal CK. When the comparison data $D_{CP}$ is "10", i.e., when the count data $D_{CN}$ is greater than the present threshold data $D_{TH2}$, the generator 15 feeds out the control signal $S_C$ as voltage higher than the reference voltage $V_{REF}$ to increase the frequency of the clock signal CK. When the comparison data $D_{CN}$ is "01", i.e., when the count data $D_{CN}$ is less than the present threshold data $D_{TH}$, the generator 15 feeds out a voltage lower than the control signal $S_C$ by the reference voltage $V_{REF}$ to reduce the frequency of the clock signal CK.

Figure 3:
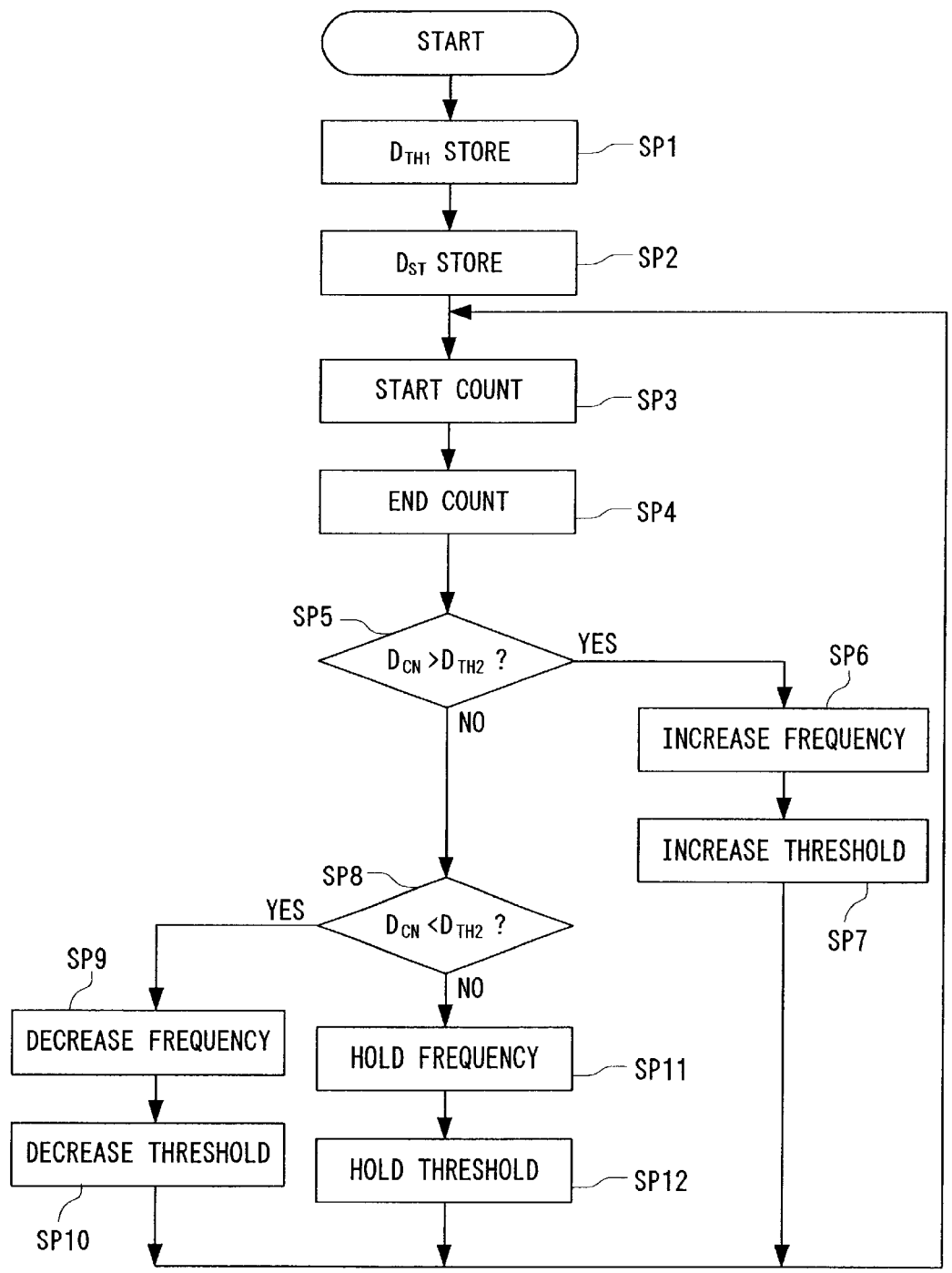
FIG. 3 is a flow chart showing the power consumption reducing operation in the radio set according to the present invention.

The power consumption reducing operation in the radio set having the above construction, will now be described with reference to the flow chart shown in FIG. 3 and the timing chart shown in FIG. 4.

When the power supply to the radio unit is turned on, the initial threshold data $D_{TH1}$ is stored as the present threshold data $D_{TH2}$ in the threshold register 1 (step SP1). Subsequently, after the lapse of a predetermined period of time the step data $D_{ST}$ is supplied from the CPU 1 to the data bus 5, and is stored in the threshold register 13 (step SP2).

Then, when the timing signal generator 11 makes the timing signal $S_{TM1}$ active for the first time as shown in (1) in FIG. 4, the counter 12 starts counting of pulses of the read signal $S_{RD}$ fed out from the CPU 1 (step SP3). When the timing signal generator 11 makes the timing signal $S_{TM1}$ active for the second time upon lapse of time corresponding to the cycle period $T_1$ as shown in (1) in FIG. 4, the counter 12 counts pulses of the read signal $S_{RD}$ fed out from the CPU 1, and feeds out the count as count data $D_{CN}$ to the comparator 14 (step SP4).

When the timing signal generator 11 makes the timing signal $S_{TM2}$ active upon lapse of a time corresponding to cycle period $T_2$ after making the timing signal $S_{TM1}$ active for the second time as shown in (2) in FIG. 4, the comparator 14 compares the count data $D_{CN}$ fed out from the counter 12 and the present threshold data $D_{TH2}$ fed out from the threshold register 13, and feeds out the result as comparison data $D_{CP}$ to the threshold register 13 and the control signal generator 15 (step SP5).

When the count data $D_{CN}$ is greater than the present threshold data $D_{TH2}$, the comparator 14 feeds out "10" as comparison data $D_{CP}$ to the threshold register 13 and the control signal generator 15. When the count data $D_{CP}$ is less than the present threshold data $D_{TH2}$, the comparator 14 feeds out "01" as comparison data $D_{CP}$. When the count data $D_{CN}$ is equal to the present threshold data $D_{TH2}$, "00" is fed out as comparison data $D_{CP}$.

Thus, when the timing signal generator 11 makes the timing signal $S_{TM3}$ active upon lapse of time corresponding to cycle time $T_3$ after making the timing signal $S_{TM1}$ active for the second time as shown in (3) in FIG. 4, the control signal generator 15 converts the comparison data $D_{CP}$ to the control signal $S_C$, and continuously feeds out the control signal $S_C$ to the oscillator 2 (steps SP6, SP9 and SP11).

Where the oscillator 2 is constituted by, for instance, a VCO, when the comparison data $D_{CP}$ is "10", that is, when the count data $D_{CN}$ is greater than the present threshold data $D_{TH2}$, the control signal generator 15 feeds out the control signal $S_C$ as voltage higher than the reference voltage $V_{REF}$ by a predetermined voltage to increase the frequency of clock signal CK (step SP6). When the comparison data $D_{CP}$ is "01", that is, when the count data $D_{CN}$ is less than the present threshold data $D_{TH2}$, the generator 15 feeds out the control signal $S_C$ as voltage higher than the reference voltage $V_{REF}$ by a predetermined voltage to decrease or reduce the frequency of clock signal CK (step SP9). When the comparison data $D_{CP}$ is "00", that is, when the count data $D_{CN}$ is equal, to the present threshold data $D_{TH2}$, the generator 15 feeds out the control signal $S_C$ as the reference voltage $V_{REF}$ to hold the frequency of the clock signal CK (step SP11).

Thus, when the control signal $S_C$ fed out from the frequency control circuit 3 is higher than the reference voltage $V_{REF}$ by a predetermined voltage, the oscillator 2 increases the frequency of the clock signal CK and feeds out it to the CPU 1 and the frequency control circuit 3. When the control signal $S_C$ is lower than the reference voltage $V_{REF}$ by a predetermined voltage, the oscillator 2 reduces the frequency of the clock signal CK. When the control signal $S_C$ is equal to the reference voltage $V_{REF}$, the oscillator 2 holds the frequency of the clock signal CK.

The clock signal CK fed out to the CPU 1 is thus at an optimum frequency corresponding to the load on the CPU 1. This is so for the following reason.

Usually, when the load on the CPU 1 has an increasing trend, the number of pulses of the read signal $S_{RD}$ fed out in a predetermined period of time, also has an increasing trend. On the other hand, when the load on the CPU 1 has a reducing trend, the number of pulses of the read signal, $S_{RD}$ fed out from the CPU 1 also has a reducing trend. In the radio set, the CPU 1 and other circuits 4 are usually formed with CMOS in order to reduce the power consumption. A circuit which is formed with CMOS, has a property that the power consumption is increased in proportion to the frequency of the clock signal CK supplied to it.

Accordingly, in this embodiment the frequency control circuit 3 is adapted to count pulses of the read signal $S_{RD}$ fed out from the CPU 1 for a predetermined period of time, and when the count is less than a predetermined threshold value, it decides that the load on the CPU 1 is on a reducing trend. In this case, the circuit 3 reduces the frequency of the clock signal CK fed out to the CPU 1 to such an extent that doing so has no adverse effects on the operation. In this way, the power consumption in the CPU 1 is reduced when the load is reducing.

When the timing signal generator 11 makes the timing signal $S_{TM4}$ active upon lapse of a time corresponding to the cycle time $T_4$ after making the timing signal $S_{TM1}$ active for the second time as shown in (4) in FIG. 4, the threshold register 13 computes the present threshold data $D_{TH2}$ according to the present threshold data $D'_{TH2}$, the step data $D_{ST}$ and the comparison data $D_{CP}$ fed out from the comparator 14, and stores the data $D_{TH2}$ while feeding out the same to the comparator 14 (steps SP7, SP10 and SP12).

For example, when the comparison data $D_{CP}$ is "10", that is, when the count data $D_{CN}$ is greater than the present threshold data $D_{TH2}$, the threshold register 13 makes the sum of addition of the present threshold data $D'_{TH2}$ and the step data $D_{ST}$ to be the present threshold data $D_{TH2}$ (step SP7). When the comparison data $D_{CP}$ is "01", that is, when the count data $D_{CN}$ is less than the present threshold data $D_{TH2}$, the threshold register 13 makes the difference of the step data $D_{ST}$ from the present threshold data $D'_{TH2}$ to be the present threshold data $D_{TH2}$ (step SP10). When the count data $D_{CP}$ is equal to the present threshold data $D_{TH2}$, the register 13 feeds out the present threshold data $D'_{TH2}$ directly as the present threshold data $D_{TH2}$.

Subsequently, whenever the timing signal generator 11 makes the timing signals $S_{TM1}$ to $S_{TM4}$ active, the counter 12, the comparator 14, the control signal generator 15 and the threshold register 13 recurrently execute the operations as described above.

As is seen, with the construction of this example, the frequency of the clock signal CK is controlled according to the number of pulses of the read signal $S_{RD}$ fed out from the CPU 1 irrespective of the communication system adopted for the radio set. Thus, the present invention is applicable to even a radio set, in which the communication is made in a communication system other than a time division multiplex system, for instance a frequency division multiplex system or a code division multiplex system, and a radio set, which is not set in any intermittent reception mode but continuously transmits or receives data although the communication is made in a time division multiplex system. The present invention thus features rich versatility.

In addition, with the construction of the embodiment the frequency control circuit 3 which has a hardware construction controls the frequency of the clock signal CK. Thus, unlike the prior art circuit the CPU 1 itself need neither measure the own processing load not control any operation control clock feeding element. This means that no special software for any power consumption reducing process is necessary and that no problem of increasing the burden on the CPU 1 arises. It is thus possible to efficiently reduce the power consumption.

While an embodiment of the present invention has been described with reference to the drawings, its specific construction is by no means limitative, and various changes and modifications may be made in the details of the design without departing from the scope of the present invention.

For example, while the above embodiment concerned with the case of controlling the frequency of the clock signal CK according to the number of pulses of the read signal $S_{RD}$ in compliance with the consideration that the number of pulses of the read signal $S_{RD}$ fed out from the CPU 1 in a predetermined period of time has an increasing trend when the load on the CPU 1 also has an increasing trend while having a reducing trend when the load on the CPU 1 also has a reducing trend, this is by no means limitative. Specifically, it is also possible to permit control of the frequency of the clock signal CK according to a signal, which is substantially in a proportional reaction to the variation of the load on the CPU 1, for instance the number of pulses of the write signal $S_{WR}$ instructing the writing of the data fed out from the CPU 1 so long as the number of pulses of the write signal $S_{WR}$ is substantially in a proportional relation to the variation of the load on the CPU 1.

Also, while the above embodiment concerned with the case where the oscillator 2 is constructed with a VCO, this is by no means limitative. Specifically, the oscillator 2 may have any construction so long as the frequency of the clock signal CK is controlled according to the control signal $S_C$.

Furthermore, while the above embodiment concerned with the case, in which the initial threshold data $D_{TH1}$ is stored as the present threshold data $D_{TH2}$ in the threshold register 13 when the power supply to the radio unit is turned on, and also in which the step data $D_{ST}$ is fed out from the CPU 1 via the data bus 5 to and stored in the threshold register 13 when a predetermined period of time has passed from an instant of turn-"on" of the power supply to the radio unit, this is by no means limitative. Specifically, it is possible to permit the user of the radio set to set the initial threshold data $D_{TH1}$ and/or the step data $D_{ST}$ by operating an operating unit constituting the other circuits 4.

Still further, the present invention is applicable to radio sets, particularly those using batteries or battery cells as power supply, those such as portable/car telephone sets (cellular sets) and personal handyphone systems (PHS) having a cordless telephone function and a cellular function, and these such as pocket bells, personal radio sets and civil radio (CB) sets.

As has been described in the foregoing, with a construction according to the present invention the frequency of the clock signal fed out to the central processing unit is controlled according to a proportional-to-load signal, which is fed out from the central processing unit and is substantially in a proportional relation the variation of the load on the central processing unit, and thus features rich versatility.

Also, with another construction according to the present invention the frequency control circuit constructed by hardware controls the frequency of the clock signal. Thus, unlike the prior art the central processing unit itself need not measure its own processing load or control the oscillator.

This means that it is not necessary to provide special software for any power consumption reducing process or increase the load on the central processing unit.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A power consumption reducing method for a radio set wherein:

a frequency of a clock signal fed out to a central processing unit for controlling various parts of the radio set is controlled on the basis of the number of pulses of a proportional-to-load signal fed out from the central processing unit in a predetermined period of time so that the frequency of the clock signal is increased when the number of pulses of the proportional-to-load signal is greater than a predetermined threshold value, is reduced when the number of pulses is less than the threshold value, and is held without being changed when the number of pulses is the same as the threshold value, and the threshold value is increased by a predetermined value when the number of pulses is greater than the threshold value, is reduced by a predetermined value when the number of pulses is less than the threshold value, and is held without being changed when the number of pulses is the same as the threshold value.

2. The power consumption reducing method for a radio unit according claim 1, wherein:

the proportional-to-load signal is a read signal instructing the reading of data or a write signal instructing the writing of data.

3. A radio unit comprising:

a central processing unit for controlling various parts of the radio set to realize a radio communication function;

an oscillator for generating a clock signal at frequency controlled on the basis of a control signal and feeding out the clock signal to the central processing unit; and a frequency control circuit for generating the control signal on the basis of a proportional-to-load signal, which is fed out from the central processing unit and substantially in a proportional relation to the variation of the load on the central processing unit, wherein:

the frequency control circuit includes a timing signal generator, a counter, a threshold register, a comparator and a control signal generator;

the timing signal generator generates a first timing signal becoming active for every predetermined cycle period according to the clock signal, and a second to a fourth timing signal becoming active upon lapse of respective different times from an instant when the first timing signal has become active in every cycle time of the first timing signal;

the counter counts pulses of the proportional-to-load signal for a period from an instant when the first timing signal becomes active till an instant when the first timing signal becomes active again;

the threshold register stores initial threshold data set as present threshold data when the power supply to the radio set is turned on and step data set in the central processing unit upon lapse of a predetermined period of time from an instant when the power supply to the radio unit is turned on, and computes and stores present threshold data according to the present threshold data, the step data and comparison data fed out from the comparator when the fourth timing signal becomes active;

when the second timing signal becomes active, the comparator compares the count data fed out from the counter and the present threshold data fed out from the threshold resister, and feeds out the result of comparison as comparison data to the threshold register and the control signal generator; and when the third timing signal becomes active, the control signal generator converts the comparison data to the control signal and feeds out the control signal to the oscillator when the third timing, signal becomes active.

4. The radio set according to claim 3, wherein:

the control signal generator generates a control signal for increasing the frequency of the clock signal when the comparison data indicates that the count data is greater than the present threshold data, generates a control signal for reducing the frequency of the clock signal when the comparison data indicates that the count data is less than the present threshold data, and generates a control signal for holding the present frequency of the clock signal without being changed when the count data indicates that the count data is the same as the present threshold data.

5. The radio unit according to claim 4, wherein:

the threshold register makes the result of addition of the step data to the prevailing present threshold data to be new present threshold data when the count data indicates that the count data is greater than the prevailing present threshold data, makes the result of the subtraction of the step data from the prevailing present threshold data to be new present threshold data when the comparison data indicates that the count data is less than the prevailing present threshold data, and directly makes the prevailing present threshold data to be new present threshold data when the comparison data indicates that the count data is the same as the prevailing present threshold data.

6. The radio set according to claim 3, wherein the proportional-to-load signal is a read signal instructing the reading of data or a write signal instructing the writing of data.

7. The radio set according to claim 3, wherein the oscillator is a voltage controlled oscillator for generating a clock signal at frequency corresponding to the voltage of the control signal.

8. A radio unit comprising:

a central processing unit for controlling various parts of the radio set to realize a radio communication function;

an oscillator for generating a clock signal at frequency controlled on the basis of a control signal and feeding, out the clock signal to the central processing unit; and a frequency control circuit for generating the control signal on the basis of the number of pulses of a proportional-to-load signal which is fed out from the central processing unit in a predetermined period of time and substantially in a proportional relation to the variation of the load on the central processing unit, wherein:

the frequency control circuit includes a timing signal generator, a counter, a threshold register, a comparator and a control signal generator;

the timing signal generator generates a first timing signal becoming active for every predetermined cycle period according to the clock signal, and a second to a fourth timing signal becoming active upon lapse of respective different times from an instant when the first timing signal has become active in every cycle time of the first timing signal;

the counter counts pulses of the proportional-to-load signal for a period from an instant when the first timing signal becomes active till an instant when the first timing signal becomes active again;

the threshold register stores initial threshold data set as present threshold data when the power supply to the radio set is turned on and step data set in the central processing unit upon lapse of a predetermined period of time from an instant when the power supply to the radio unit is turned on, and computes and stores present threshold data according to the present threshold data, the step data and comparison data fed out from the comparator when the fourth timing signal becomes active;

when the second timing signal becomes active, the comparator compares the count data fed out from the counter and the present threshold data fed out from the threshold register, and feeds out the result of comparison as comparison data to the threshold register and the control signal generator; and when the third timing signal becomes active, the control signal generator converts the comparison data to the control signal and feeds out the control signal to the oscillator when the third timing signal becomes active.

9. The radio set according to claim 8, wherein:

the control signal generator generates a control signal for increasing the frequency of the clock signal when the comparison data indicates that the count data is greater than the present threshold data, generates a control signal for reducing the frequency of the clock signal when the comparison data indicates that the count data is less than the present threshold data, and generates a control signal for holding the present frequency of the clock signal without being changed when the count data indicates that the count data is the same as the present threshold data.

10. The radio unit according to claim 9, wherein:

the threshold register makes the result of addition of the step data to the prevailing present threshold data to be new present threshold data when the count data indicates that the count data is greater than the prevailing present threshold data, makes the result of the subtraction of the step data from the prevailing present threshold data to be new present threshold data when the comparison data indicates that the count data is less than the prevailing present threshold data, and directly makes the prevailing present threshold data to be new present threshold data when the comparison data indicates that the count data is the same as the prevailing present threshold data.

11. A radio set comprising a central processing unit for controlling various parts in the set, an oscillator for generating a frequency-controlled clock on the basis of a control signal and feeding out the generated clock to the central processing unit, and a frequency control circuit for generating the control signal based on the number of pulses of a proportional-to-load signal outputted from the central processing unit and substantially proportional to changes in the load of the central processing unit, wherein:

the frequency control circuit includes a timing signal generator, a counter, a threshold register, a comparator and a control signal generator;

the timing signal generator generates, on the basis of the clock, a first timing signal becoming active in every predetermined cycle and a second to a fourth timing signals becoming active after lapse of different periods of time, respectively, after the first timing signal has become active in every cycle of the first timing signal;

the counter counts pulses of the proportional-to-load signal during a period from an instant when the first timing signal becomes active to an instant when the first timing signal becomes active again;

the threshold register stores initial threshold data as the present threshold data when the power supply to the radio set is turned on and also step data set in the central processing unit after lapse of a predetermined period of time when the power supply to the radio set is turned on, and computes and stores present threshold data based on the present threshold data, the step data and comparison data fed out from the comparator when the fourth timing signal becomes active;

the comparator compares when the second timing signal becomes active, the count data fed out from the counter and the present threshold data fed out from the threshold register, and feeds out the result of comparison as comparison data to the threshold register and also to the control signal generator; and the control signal generator converts, when the third timing signal becomes active, the comparison data to the control signal and feeds out the control signal to the oscillator.

12. The radio set according to claim 11, wherein:

the control signal generator generates, when the comparison data shows that the count data is greater than the present threshold data, a control signal for increasing the frequency of the clock, generates, when the comparison data shows that the count data is less than the present threshold data, a control signal for reducing the frequency of the clock, and generates, when the comparison data shows that the count data is equal to the present threshold data, a control signal for holding the present frequency of the clock.

13. The radio set according to claim 11, wherein:

the threshold register makes, when the comparison data shows that the count data is greater than the present threshold data, the result of addition of the step data to the present threshold data to be the new present threshold data, makes, when the comparison data shows that the count data is less than the present threshold data, the result of subtraction of the step data from the present threshold data to be the new present threshold data, and makes, when the comparison data shows that the count data is equal to the present threshold data, the present threshold data to be the new threshold data.

14. The radio set according to claim 12, wherein:

the threshold register makes, when the comparison data shows that the count data is greater than the present threshold data, the result of addition of the step data to the present threshold data to be the new present threshold data, makes, when the comparison data shows that the count data is less than the present threshold data, the result of subtraction of the step data from the present threshold data to be the new present threshold data, and makes, when the comparison data shows that the count data is equal to the present threshold data, the present threshold data to be the new threshold data.

15. The radio set according to claim 11, wherein:

the proportional-to-load signal is either a read signal instructing the reading of data or a write signal instructing the writing of data.

16. The radio set according to claim 12, wherein:

the proportional-to-load signal is either a read signal instructing the reading of data or a write signal instructing the writing of data.

17. The radio set according to claim 13, wherein:

the proportional-to-load signal is either a read signal instructing the reading of data or a write signal instructing the writing of data.

18. The radio set according to claim 11, wherein:

the oscillator is a voltage-controlled oscillator for generating a clock at a frequency corresponding to the voltage of the control signal.

19. The radio set according to claim 12, wherein:

the oscillator is a voltage-controlled oscillator for generating a clock at a frequency corresponding to the voltage of the control signal.

20. The radio set according to claim 13, wherein:

the oscillator is a voltage-controlled oscillator for generating a clock at a frequency corresponding to the voltage of the control signal.

21. The radio set according to claim 14, wherein:

the oscillator is a voltage-controlled oscillator for generating a clock at a frequency corresponding to the voltage of the control signal.

* * * * *